UNITED STATES PATENT OFFICE.

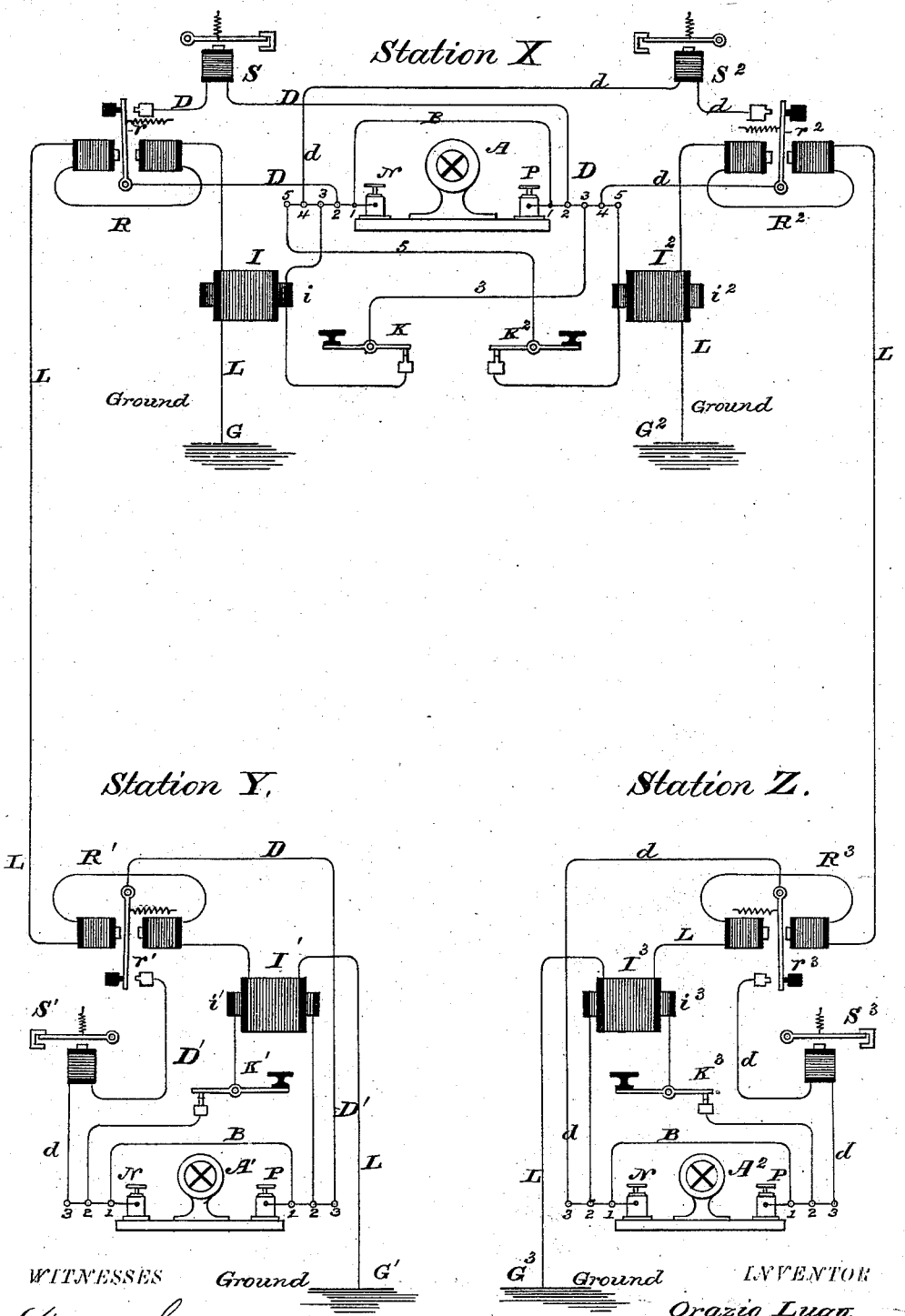

ORAZIO LUGO, OF NEW YORK, N. Y.

DYNAMO-ELECTRIC AND INDUCTIVE TELEGRAPHY.

SPECIFICATION forming part of Letters Patent No. 235,690, dated December 21, 1880.

Application filed September 25, 1880. (No model.)

*To all whom it may concern:*

Be it known that I, ORAZIO LUGO, a citizen of the United States, residing in the city, county, and State of New York, have invented a certain new and useful Improvement in Dynamo-Electric and Inductive Telegraphy, of which the following is a specification.

My invention relates to that class of telegraphs in which dynamo-electricity is substituted for voltaic electricity or chemical batteries, as shown in sundry applications for Letters Patent of mine now pending.

The subject-matter claimed is specifically set forth at the end of this specification.

The essential elements of my improved organization are a dynamo-electric machine or generator, a shunt-wire or short circuit connecting the opposite poles of the armatures thereof, the resistance of which shunt-wire is greater than the internal resistance of the machine, a transmitting-key in the primary circuit of an induction-coil, and suitable signaling apparatus in a telegraphic circuit, including the secondary wire of said induction-coil.

The accompanying drawing represents a diagram of my improved apparatus organized in the best way now known to me.

My improvement contemplates the employment of the most approved apparatus of the present day. The details of construction of such apparatus, however, are well known, and need not, therefore, be herein described, as the construction and arrangement of the apparatus may be modified in various ways without departing from the principle of my invention. I prefer to employ under this system a generator at each station; but any number of instruments at such station may be operated from the same generator.

The diagram represents three stations—a central one, X, and two terminal stations, Y Z. The organization of apparatus of each station being substantially similar, a description of one will be sufficient, the arrangement of the two sets of transmitting apparatus at the central station requiring nothing beyond the mere skill of the workman in running the circuits properly. Each dynamo-electric machine or generator A A′ A² is shown as having the opposite poles, N P, of its armatures connected by a shunt-wire, B, the resistance of which shunt-wire is greater than the internal resistance of the machine, but less than that of the telegraphic circuit or circuits. Each station is provided with one or more transmitting-keys, K K′ K″ K‴, each included in the primary metallic circuit of an induction-coil in branch circuit with the shunt of the generator—that is to say, including the opposite poles of the armature in its circuit. The secondary wire of these induction-coils I I′ I² I³ and relays R R′ R² R³ are included in the main line L, which is an ordinary earth-circuit. The primary circuits may be kept either normally open or closed, as preferred.

The sounder S S′ S² S³ of each relay might be worked with a local battery in the ordinary way; but I prefer to charge it direct from the main generator, which I do by including it in an independent branch circuit, D d, which circuit, starting from one pole of the generator, passes through the armature $r\ r'\ r^2\ r^3$ of each relay, and through the helix of the sounder back to the other pole of the generator.

I will now describe the circuit-connections between the home station and one of the terminal stations. The arrangement under the organization shown being duplicated for each station, a description of one will be sufficient for the proper understanding of the other.

The transmitting-key K at the sending-station X is included in a primary closed metallic circuit, starting from the south pole P of the generator A at 3, and running through the wire 3, key K, the primary helix $i$ of the induction-coil I, and the wire 3, again back to the north pole of the generator, and through the generator to the starting-point at 3. The makes and breaks in the primary current caused by key K in this circuit are reproduced upon the helix $i$ of the induction-coil I, which is included in the line-wire. The latter is what is known as an "earth-circuit," starting from the ground at G′, passing through the secondary helix of the induction-coil I, thence through the relay R, line-wire L, relay R′, and the secondary helix of the induction-coil I′ at station Y to the ground at G′. The sounder S at the sending-station X is always included in a metallic circuit passing through the point 2, connected with the south pole of the generator, through the wire D, the helix of the sounder S, its contact-point, the tongue r of the relay, and wire D, back through the point 2 to the north pole N, to the generator, thence through the generator to the starting-point. The organization at the receiving-station is substantially the same, and the parts are similarly lettered. Under this organization it will be seen that the sounder is in branch circuit with the shunt-wire and transmitting-key, and that while the tongue or armature of the sounder is controlled by the primary circuit from the generator its circuit is made or broken by the vibrations of the tongue or armature of the relay, which is actuated by the secondary current of the line-wire.

The operation of the apparatus will readily be understood from the foregoing description.

When the transmitting-key is closed a portion of the charge of the machine passes through the primary circuit, the makes and breaks in which circuit induce corresponding impulses in the secondary circuit in a well-known way, and vibrate the tongues of the relays, the effect of which is to open and close the circuit of the sounders, causing them to respond correspondingly.

My pending applications above referred to show methods of and apparatus for practicing the art of dynamo-electric telegraphy without induced currents. I therefore make no claim to the methods or apparatus shown in those applications, but limit the claim herein to apparatus involving the use of a secondary or induced current, or induction apparatus.

I claim as of my own invention—

The combination, substantially as herein set forth, of a dynamo-electric machine or generator, a shunt-wire or short circuit connecting the opposite poles of its armatures, a primary circuit (in which is included a key and the primary helix of an induction-coil) in branch circuit with said shunt-wire, with a telegraphic circuit or main line in which are included the secondary helix of the induction-coil, and signaling-instruments actuated by the currents induced in the secondary circuit by the makes and breaks of the primary.

In testimony whereof I have hereunto subscribed my name this 23d day of September, A. D. 1880.

ORAZIO LUGO.

Witnesses:
WM. J. PEYTON,
NELLIE L. HOLMES.